United States Patent [19]

Mitterer et al.

[11] 4,164,692

[45] Aug. 14, 1979

[54] OPERATING MECHANISM FOR A PIVOTABLE SLIDING PANEL

[75] Inventors: Erik Mitterer, Stockdorf; Alfons Lutz, Emmering, both of Fed. Rep. of Germany

[73] Assignee: Webasto-Werk W. Baier GmbH & Co., Fed. Rep. of Germany

[21] Appl. No.: 873,527

[22] Filed: Jan. 30, 1978

[30] Foreign Application Priority Data

Feb. 5, 1977 [DE] Fed. Rep. of Germany ....... 2704899

[51] Int. Cl.² .......................................... H02P 5/06
[52] U.S. Cl. ..................................... 318/266; 318/468
[58] Field of Search ............... 318/257, 265, 266, 272, 318/468

[56] References Cited

U.S. PATENT DOCUMENTS

| 3,028,533 | 4/1962 | Wishart, Jr. | 318/468 X |
|---|---|---|---|
| 3,264,543 | 8/1966 | Yoshida | 318/266 |
| 3,673,482 | 6/1972 | Davey | 318/266 |
| 3,702,430 | 11/1972 | Knetch | 318/468 |
| 3,829,155 | 8/1974 | Lutz | 318/468 X |
| 4,006,392 | 2/1977 | Catlett et al. | 318/266 |
| 4,070,607 | 1/1978 | Mitterer | 318/468 |

*Primary Examiner*—J. V. Truhe
*Assistant Examiner*—W. E. Duncanson, Jr.
*Attorney, Agent, or Firm*—Craig and Antonelli

[57] ABSTRACT

Control apparatus is provided for an electromechanically operated closure panel such as used for sun roofs of automobiles and the like. The control apparatus includes a reversible electric motor drivingly connected to move the closure panel between a closed position and respective slidably retracted and pivoted open positions. In order to accommodate for the differences in relative movement between the electric motor and the closure panel during movement between the closed position and the tilted position, as compared to the movement between the closed position and the slidably retracted position, the invention provides a control mechanism for controlling the speed of the electric motor so as to reduce the same during tilting movement of the closure panel.

12 Claims, 5 Drawing Figures

OPERATING MECHANISM FOR A PIVOTABLE SLIDING PANEL

BACKGROUND AND SUMMARY OF THE INVENTION

The invention relates to an operating mechanism for a pivotable sliding panel of a vehicle roof with an electric motor driving the panel whose both terminals can be connected through first and second interconnectors by means of a reversing switch selectively to different poles of a power source in order to be able to reverse the direction of rotation of the motor and with it the direction of motion of the sliding panel. In order to attain an automatic switching off of the motor in the closed position of the panel, and regardless whether the panel goes into the closed position from a pivoted position or from a slid back position, in the first interconnector between the motor and the reversing switch a first switch is arranged which is operated by an impulse relay whose control winding is connected on the one hand to the first interconnector between the first switch and the reversing switch through a first connecting line and on the other hand to the second interconnector through a second connecting line in which a second switch is provided which is operated via a control member driven by the motor in such a way that the said switch is closed in the closed position of the sliding panel, yet open during the opening and closing process. Such an operating mechanism is described in commonly assigned U.S. Pat. No. 3,702,430 (corresponding to German Patent Application No. P 21 00 336. 1).

A certain problem is pivotable sliding panels resides in the fact that the path of the driving means (such as a stiff, push-pull cable) moving the panel is substantially shorter for the pivoting movement of the panel than for the sliding movement of the panel, with the result that at equal speed of the driving means the time required for the pivoting of the panel is substantially shorter than the time required to slide back the panel. The consequence of this is that the pivoting motion of the panel cannot be as sensitively controlled as the sliding motion. The problem described was already solved for sliding panels driven by a hand crank in that one provided for an additional gearing step for the pivoting motion of the panel between the crankshaft and the driving pinion, which causes the gearing to become slower, see DT-OS (German Offenlegungsschrift) No. 2,447,190. The incorporation of such a working gear stage would also fundamentally be possible in a sliding panel driven by an electric motor, however, such an expense does not seem warranted.

The invention has taken on the task of extending the duration of the outward pivotal motion of the sliding panel in a simple manner with an operating mechanism constructed according to the above-noted U.S. Pat. No. 3,702,430.

In accordance with the invention, the above-noted problem was solved in that speed reducing means for reducing the speed of the motor are provided for, which speed reducing means can be switched on by the control member when it moves out of the position corresponding to the closed position of the panel in the sense of a pivoting of the panel.

Through the suggestion in accordance with the invention a slow pivoting of the panel and with it a more sensitive steering or control are accordingly made possible as in the previously mentioned mechanically-driven sliding panel.

According to a preferred embodiment, the speed reducing means for reducing the speed of the motor is formed as an electrical resistor inserted in an interconnector. According to other preferred embodiments an electronic control element such as an electric pulse generator or longitudinal control with transistor or another familiar electronic means, are provided for instead of the electrical resistance to regulate motor speed. Another alternative embodiment consists of employing a motor with two windings, one for high and one for lower speed, whereby the winding for lower speed is switched on to pivot the panel, while the other winding is switched on for longitudinal movement of the panel.

The speed reducing means for reducing the speed of the motor is also preferably additionally switched on when the panel nears an end or closed position and, in fact, independently of whether the pivoting or sliding motion is involved. Thus a gentle closing of the panel or a gentle movement in the appropriate end position results.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
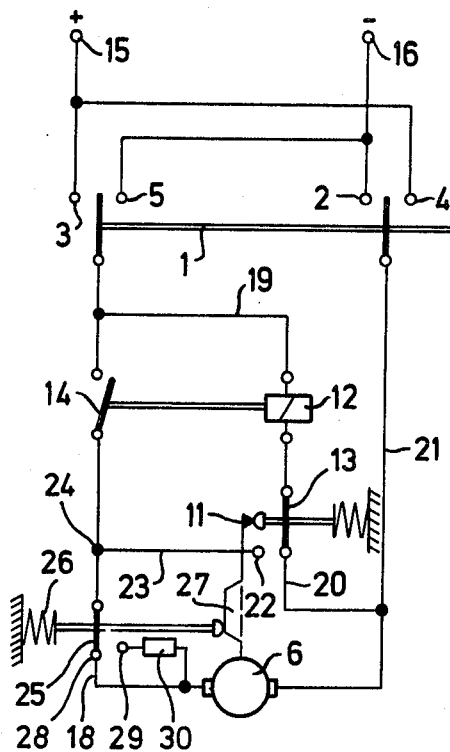
FIG. 1 is a circuit diagram showing a preferred embodiment of the invention with the control member in the position corresponding to the closed position of the sliding panel.

The reversing switch 1 depicted in FIG. 1 which returns by itself to the depicted zero-position by a spring now shown allows itself to be switched by pushing against the contacts 2, 3 and by pulling against the contacts 4, 5. The contacts 3 and 4 are connected to the positive pole 15 and the contacts 2 and 5 are connected to the negative pole 16 of a current source. The wipers of the reversing switch 1 are connected through a first interconnector 18 and a second interconnector 21 to the terminals of an electric motor 6. The motor 6 can then be driven in the one or the other direction of rotation according to the operating direction of the reversing switch 1, whereby motor 6, in the applied case depicted in FIGS. 3 to 5, either pivots or slides back a panel 18 from an opening in the roof by means of a stiff push-pull cable 7, a transport bridge 8 and a lever arm 9. In the first interconnector 18 a first switch 14 is arranged which is operated by an impulse relay 12. The control winding of the impulse relay 12 is connected, on the one hand, to the first interconnector 18 between the first switch 14 and the reversing switch 1 through a first branch line 19 and, on the other hand, to the second interconnector 21 via a second branch line 20. In the second branch line 20 a second switch 13 is provided for which is operated by a control member 11 (such as a cam member or the like). The control member 11 is moved by the motor 6 in the one direction of rotation into the position 11' noted in FIG. 2 and in the other motor direction of rotation into the position 11" indicated in dashed lines.

Figure 3:
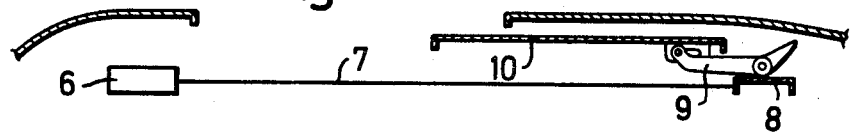
FIG. 3 is a side schematic view of a vehicle roof constructed in accordance with the invention and with a lifting sliding panel in its open end position.
Figure 4:
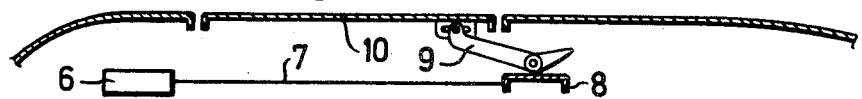
FIG. 4 is a side schematic view of the roof shown in FIG. 3 with the panel in the closed position.

If the reversing switch is switched against the contacts 2 and 3 from the closed position of the sliding panel depicted in FIGS. 1 and 4, then the impulse relay 12 first receives power via the closed switch 13, whereby the switch 14 is closed and the motor is connected with the poles 15, 16 of the power source. The panel 10 is lowered by the running motor 6 and moved into the open position depicted in FIG. 3. Simultaneously the control member 11 is also moved into position 11' opening switch 13. The end of the opening motion is effected by releasing the reversing switch 1 or by reaching a stop not shown, in which case a slip friction clutch, known in itself, prevents a choking of the motor 6 until the motor is turned off by an overcurrent release.

If one wishes to bring the panel 10 from the open position into the closed position again, then the reversing switch 1 is switched against the contacts 4 and 5, whereby the motor 6 immediately receives power through the still-closed switch 14, however it is now running in the other direction because the polarity of the motor has been changed. If the closed position of the panel 10 is reached, then the control member 11, which moves back from its position 11' into its position 11 according to FIG. 1 during the closing motion, closes switch 13. Thereby the impulse relay 12, which only reacts to current impulses, receives power, so that the controller 14 is opened and thus the motor 6 is automatically turned off.

Figure 5:
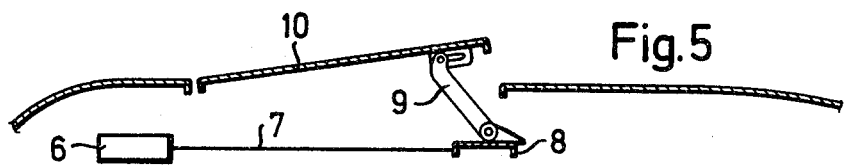
FIG. 5 is a side schematic view of the roof shown in FIG. 3 with the panel in its final pivoted position.

If the reversing switch 1 is now released and then once again switched against the contacts 4 and 5, then the impulse relay 12 receives power via the closed switch 13, closes the switch 14 and with it switches on the motor 6, whereby the panel 10 is pivoted corresponding to FIG. 5, because the transport bridge 8 is moved further out of the open position in the same direction as in the closing motion. On the other hand, the control member 11 moves into position 11". The end of the pivoting motion is effected as in opening by the release of the reversing switch 1 or by reaching a stop.

To pivot back the panel 10 from the pivoted position into the closed position the reversing switch 1 is switched against the contacts 2 and 3. The motor 6 immediately receives power through the closed switch 14, and the panel 10 is moved back into its closed position according to FIG. 4, and the control member 11 is moved back from its position 11" into the position 11 according to FIG. 1. The switching off of the motor 6 occurs, as described in the process of closing from the open position, automatically through the closing of switch 13.

An additional contact 22, which in the open position of switch 13 connects the appropriate terminal of the control winding of the impulse relay 12 to the first interconnector 18 between the terminal of the motor 6 and the first switch 14, insures that the impulse relay 12 can receive power when the reversing switch 1 is operating via the second interconnector 21, the winding of the motor 6, the line 23 and the contact 22, even when the panel 10 is pivoted or lowered a slight bit beyond the closed position according to FIG. 4 by the centrifugal force of the motor 6 or the panel 10 during closing from a pushed back position according to FIG. 3 or from a pivoted position according to FIG. 5 and thereby closing the switch 13 in the closed position according to FIG. 1 (thereby operating the impulse relay 12 and opening switch 14) but opening it again a moment later. This mode of operation is described in detail in DT-OS No. 24 54 723.

In the interconnector 18 between the motor 6 and the connecting point 24 of the connecting line 23 a two-way switch 25 is arranged which can be operated by a further cam 27 on the control member 11 counter to the effect of a spring 26. The switch 25 has two operating contacts 28 and 29, of which the contact 28 is directly connected to the terminal of the motor 6 and the contact 29 is connected via an electrical resistor 30 to this terminal. In this position of the control member 11 depicted in FIG. 1, which corresponds to the closed position of the sliding panel 10, the switch 25 is closed to the operating contact 28 so that after operation of the reversing switch 1 and the closing of switch 14 resulting thereof, the motor 6 receives the full voltage of the power source and rotates at its normal speed. The length of the cam 27 corresponds to the angular displacement of the steering arm 11 from the closed position of the panel 10 up until into the fully pushed back position according to FIG. 3.

Figure 2:
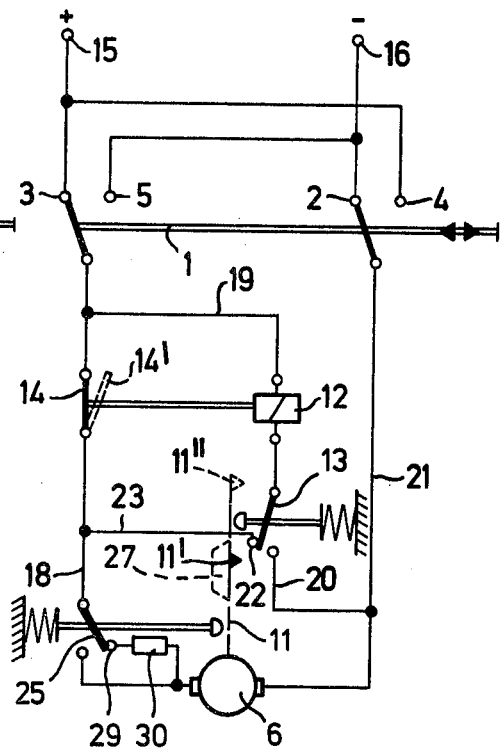
FIG. 2 is a circuit diagram of the embodiment of FIG. 1, wherein the control member is in a position corresponding to an open position of the sliding panel.

If the panel 10 is to be pivoted according to FIG. 5, then the reversing switch 1 is pressed in the other direction and the motor 6 turns in the other direction, sliding the control member 11 in FIGS. 1 and 2 upwards. During this operation, the cam 27 becomes disengaged from the switch 25 which cam now, under the effect of the spring 26, enter into its other position in which it is connected to the operating circuit 29. Since the series resistor 30 is now inserted in the circuit of the motor 6, the speed of the motor 6 is reduced and thereby the pivotal motion of the panel 10 is correspondingly slowed down.

In order to brake the motion of the sliding panel 10 into its end position according to FIG. 3 and, conversely, also its motion into the closed position, the cam 27 is preferably so formed that it does not work together with the switch 25, either in the closed position, or in the end position, but rather is in these positions in the position depicted in FIG. 2, which corresponds to the lower speed of the motor 6, and brings the switch 5 into the position of FIG. 1 only after leaving the closed position via the greatest part of the sliding path of the sliding panel 10 up until shortly before reaching the end position according to FIG. 3, thus switching the motor 6 over into a higher speed. During all other motion processes, the motor 6 runs at the lower speed.

While we have shown and described several embodiments in accordance with the present invention, it is understood that the same is not limited thereto but is susceptible of numerous changes and modifications as known to those skilled in the art and we therefore do not wish to be limited to the deails shown and described herein but limited to cover all such changes and modifications as are encompassed by the scope of the appended claims.

We claim:

1. Control apparatus for an electromechanically operated closure panel such as used for sunroofs of automobiles and the like; said control apparatus comprising:

an electric motor,
transmission means drivingly interconnecting said electric motor and a closure panel for moving said closure panel along a closure panel path between a plurality of respective predetermined positions,
and control means for operating said electric motor at a first motor speed for moving said closure panel along first portions of the closure panel path and at a second motor speed for moving said closure panel along second portions of the closure panel path, said second motor speed being substantially slower than said first motor speed to accommodate optimum control of the movement of said closure panel along said second portions of the closure panel path,
wherein the closure panel is a pivotable sliding panel with the respective predetermined positions of the closure panel including:
a closed position with said closure panel closing an opening in a vehicle panel structure,
a retracted open position with said closure panel disposed under said vehicle panel structure,
and a pivoted open position with said closure panel disposed with one end thereof above said vehicle panel structure, and
wherein said first portions of the closure panel path include at least a part of the path between said closed positions and said retracted open position, and wherein said second portions of the closure panel path include at least a part of the path between said closed position and said pivoted open position.

2. Apparatus according to claim 1, wherein said second portion of the closure panel path include the respective end parts of the path between said closed position and said retracted open position.

3. Apparatus according to claim 1, wherein said control means includes a selectively engageable resistor interposed in the driving circuit for said electric motor.

4. Apparatus according to claim 3, wherein said control means includes a control member driven by said motor, said control member being operative to selectively engage said resistor as a function of the position of said control member.

5. Apparatus according to claim 1, wherein said control means includes an electronic control element interposed in the driving circuit for said electric motor.

6. Apparatus according to claim 1, wherein said motor has two windings including a first winding for higher speed operation and a second winding for lower speed operation, and wherein said control means includes means for selectively switching between said windings in dependence on the position of the closure panel.

7. Apparatus according to claim 1, wherein said motor is a reversible electric motor,
wherein the driving circuit for the electric motor includes:
a pole reversing switch arranged between a power source and the connecting leads of the motor,
a relay having its winding connected in parallel with the motor between the motor connections and the reversing switch,
a control switch actuated by the relay and arranged to open and close at least one of the motor leads between the parallel connections of the relay winding and the motor,
a position-responsive switch arranged in one of the connections of the relay winding;
and control member means driven by the motor for actuating the position-responsive switch in response to the movement of the closure panel and its transmission means; the control member means actuating the position-responsive switch and the relay to cut off the motor as soon as the closure panel reaches a predetermined position.

8. Apparatus according to claim 7, wherein said control means includes a portion of said control member means which is operable to selectively switch operation of said motor from said first to said second motor speed in response to operation to said motor during movement of the closure member from the closed position to the pivoted open position.

9. Apparatus according to claim 8, wherein said second portions of the closure panel path include the respective end parts of the path between said closed position and said retracted open position.

10. Apparatus according to claim 8, wherein said control means includes a selectively engageable resistor interposed in the driving circuit for said electric motor.

11. Apparatus according to claim 8, wherein said control means includes an electronic control element interposed in the diriving circuit for said electric motor.

12. Apparatus according to claim 8, wherein said motor has two windings including a first winding for higher speed operation and a second winding for lower speed operation, and wherein said control means includes means for selectively switching between said windings in dependence on the position of the closure panel.

* * * * *